(12) United States Patent
Seo et al.

(10) Patent No.: US 8,081,265 B2
(45) Date of Patent: Dec. 20, 2011

(54) LIQUID CRYSTAL DISPLAY DEVICE USING SMALL MOLECULE ORGANIC SEMICONDUCTOR MATERIAL

(75) Inventors: Hyun-Sik Seo, Annyang-Si (KR); Seung-Han Paek, Incheon (KR); Nack-Bong Choi, Suwon-Si (KR)

(73) Assignee: LG Display Co., Ltd., Seoul (KR)

( * ) Notice: Subject to any disclaimer, the term of this patent is extended or adjusted under 35 U.S.C. 154(b) by 297 days.

(21) Appl. No.: 12/477,714

(22) Filed: Jun. 3, 2009

(65) Prior Publication Data

US 2009/0236592 A1 Sep. 24, 2009

(51) Int. Cl.
G02F 1/136 (2006.01)

(52) U.S. Cl. .......................................................... 349/43

(58) Field of Classification Search ...................... 349/43
See application file for complete search history.

(56) References Cited

U.S. PATENT DOCUMENTS

| | | | |
|---|---|---|---|
| 5,751,020 A | 5/1998 | Lyu et al. |
| 6,197,663 B1 | 3/2001 | Chandross et al. |
| 6,207,472 B1 | 3/2001 | Callegari et al. |
| 7,186,634 B2 | 3/2007 | Yoneya |
| 7,241,652 B2 | 7/2007 | Park et al. |
| 2002/0012080 A1 | 1/2002 | Ishihara et al. |
| 2002/0043662 A1 | 4/2002 | Yamazaki et al. |
| 2003/0160235 A1 | 8/2003 | Hirai |
| 2004/0023447 A1 | 2/2004 | Hirakata et al. |
| 2006/0192907 A1 | 8/2006 | Kwon et al. |

FOREIGN PATENT DOCUMENTS

| | | |
|---|---|---|
| CN | 1333475 A | 1/2002 |
| CN | 1522470 A | 8/2004 |
| JP | 2003-309268 A | 10/2003 |
| KR | 10-1999-0037112 A | 5/1999 |
| KR | 10-2002-0084427 A | 11/2002 |
| KR | 10-2004-0040929 A | 5/2004 |
| TW | 200307483 | 12/2003 |

OTHER PUBLICATIONS

Scott, James F. et al., "Ferroelectric Memories," Science, vol. 246, No. 4936, Dec. 15, 1989, pp. 1400-1405.

*Primary Examiner* — James Dudek
(74) *Attorney, Agent, or Firm* — Birch, Stewart, Kolasch & Birch, LLP

(57) ABSTRACT

A liquid crystal display structure is provided. The liquid crystal display structure includes a pixel region and a thin film transistor on the substrate. The thin film transistor is adjacent to the pixel region and includes a gate electrode; a gate insulating layer having a top surface; a source electrode and a drain electrode at the top surface of the gate insulating layer; a semiconductor layer disposed at the top surface of the gate insulating layer, the semiconductor layer between the source electrode and the drain electrode defining a channel region, the semiconductor layer including a small molecule organic semiconductor material; and a first passivation layer covering the channel region, a top surface of the first passivation layer coinciding with or being below a top surface of each of the source electrode and the drain electrode.

11 Claims, 20 Drawing Sheets

LIQUID CRYSTAL DISPLAY DEVICE USING SMALL MOLECULE ORGANIC SEMICONDUCTOR MATERIAL

This Non-provisional Application claims priority to pending Non-provisional U.S. application Ser. No. 11/168,365 filed on Jun. 29, 2005, which claims priority to Korean Patent Application No. 2004-0075984 filed on Sep. 22, 2004, the entire contents of which are hereby incorporated by reference.

BACKGROUND OF THE INVENTION

1. Field of the Invention

The present invention relates to a liquid crystal display (LCD) device, and more particularly, to an array substrate of an LCD device and a method of fabricating the same.

2. Discussion of the Background Art

In general, a liquid crystal display (LCD) device utilizes optical anisotropy and birefringence properties of liquid crystal molecules to display images. The LCD device usually has first and second substrates spaced apart from and opposing each other, and a liquid crystal layer interposed therebetween. The first and second substrates respectively have electrodes for forming an electric field between the electrodes. That is, if a voltage is applied to the electrodes of the LCD device, an electric field is formed between the electrodes and the electric field changes the alignment of the liquid crystal molecules. The changed alignment of the liquid crystal molecules controls a light transmittance through the liquid crystal layer and thus images can be displayed by controlling the light transmittance through the liquid crystal layer.

Among the various type of LCD devices commonly used, active matrix LCD (AM-LCD) devices have been developed because of their high resolution and superiority in displaying moving images. The AM-LCD device includes a thin film transistor (TFT) in each pixel region as a switching device, a pixel electrode in each pixel region, and a common electrode.

FIG. 1 is an exploded perspective view of an LCD device according to the related art. As shown in FIG. 1, an LCD device 20 has an upper substrate 22 having a black matrix 25, a color filter layer 26 and a common electrode 28 on the color filter layer 26. The LCD device further includes a lower substrate 12 having a thin film transistor (TFT) T and a pixel electrode 18 connected to the TFT T. The color filter layer 26 includes red, green and blue color filters 26a, 26b and 26c.

A liquid crystal layer 30 is interposed between the upper and lower substrates 22 and 12. The lower substrate 12 is referred to as an array substrate because array lines including a gate line 14 and a data line 16 are formed thereon. The gate line 14 and the data line 16 cross each other, and the TFT T as a switching element is disposed in a matrix and is connected to the gate line 14 and the data line 16. The gate line 14 and the data line 16 cross each other to define a pixel region P. The TFT T is formed near the crossing portion of the gate line 14 and the data line 16. The pixel electrode 18 is formed of a transparent conductive material in the pixel region P. The upper substrate 22 is referred to as a color filter substrate because the color filter layer 26 is formed thereon.

The upper and lower substrates 22 and 12 are attached with a seal pattern (not shown) through a liquid crystal cell process. The seal pattern keeps a cell gap of the LCD device 20 uniform and prevents liquid crystal materials in the space between the upper and lower substrates 22 and 12 from leakage. Although not shown, the upper and lower alignment layers are formed at boundaries between the liquid crystal layer 30 and the upper and lower substrates 22 and 12, respectively, wherein the upper and lower alignment layers can improve reliability for alignment of the liquid crystal layer 30. In addition, the LCD device 20 includes at least one polarizer (not shown) on or under an outside surface thereof, and a backlight unit (not shown) may be disposed under the LCD device 20 as a light source.

An image signal transmitted by the data line 16 is applied to a predetermined pixel electrode 18 by sequentially scanning ON/OFF signals of the TFT T to the gate line 14. Hence, the liquid crystal layer 30 is driven by a vertical electric field, and images are displayed based on the change of the light transmittance thereof.

The base substrate of the LCD device generally has been made of a transparent glass substrate. Recently, a plastic substrate, which is lighter and more flexible than the glass substrate, is suggested as a base substrate of the LCD device for a small portable display device such as a notebook and personal digital assistants (PDA).

However, since the plastic substrate is more susceptible to heat and chemical treatment than the glass substrate, it is difficult for the LCD device to adopt the plastic substrate as the base substrate because a process of manufacturing an array substrate is usually performed under a high temperature more than about 200 degrees Celsius. Further, it usually requires several high temperature processes when manufacturing the array substrate. Therefore, to solve the problem, a color filter substrate without the array elements may be made of the plastic substrate, but the array substrate is still usually made of the glass substrate.

Another solution is using small molecule organic material and applying a low temperature process less than about 200 degrees Celsius so that the flexible plastic substrate can be used for manufacturing the array substrate.

Hereinafter, a method of fabricating the array substrate of the LCD device using the flexible plastic substrate under a low temperature of less than about 200 degrees Celsius will be described. It should be noted that although a metal layer, an insulating layer and a passivation layer do not affect the characteristics of the thin film transistor in the low temperature process, when a semiconductor layer including a channel region of the thin film transistor is made of a general semiconductor material under the low temperature process, an electric property of the thin film transistor will be affected because the semiconductor layer has a weak inner structure under the low temperature process and conductivity of the semiconductor layer is reduced in comparison with the semiconductor layer under the general temperature process.

To solve the problem, the semiconductor layer is made of an organic semiconductor material, wherein the organic semiconductor material includes a small molecule material and a polymer material. Here, the small molecule organic semiconductor material has higher conductivity than the polymer organic semiconductor material.

FIG. 2 is a schematic cross-sectional view of an array substrate including a semiconductor layer of a small molecule organic semiconductor material for an LCD device using a flexible plastic substrate according to the related art. In FIG. 2, a gate line (not shown) and a gate electrode 53 are formed by depositing and patterning a metallic material on a plastic substrate 50. A gate insulating layer 57 is then formed by coating an organic insulating material over an entire surface of the substrate 50 including the gate line and the gate electrode 53.

A semiconductor layer 60 is formed by evaporating the small molecule organic semiconductor material such as Pentacen ($C_{22}H_{14}$) over the gate electrode 53. Since the small molecule organic semiconductor material such as Pentacene is in a powder form and is difficult to be made in a solution form, it is difficult to deposit Pentacene by a chemical vapor deposition (CVD) process and pattern Pentacene by the photolithography process in which Pentacene would contact a photoresist material having moisture, a development solution and a stripping solution. Accordingly, the semiconductor layer 60 is evaporated by using a shadow mask 70 having an opening portion (not shown). However, this process imposes a limitation with respect to a width W1 of the semiconductor layer 60 and a distance W2 between the semiconductor layers 60.

More specifically, the shadow mask 70 is made of a metallic material, wherein a width of the opening portion corresponding to the width W1 of the semiconductor layer 60 should be at least more than about 40 micrometers. That is, the width of the opening portion should be at least more than about 40 micrometers, and the distance between the opening portions corresponding to the distance W2 between the semiconductor layers 60 should be more than about 120 micrometers. This is because diffusion of the material should be taken into account in the evaporation process.

As a result, the width W1 of the semiconductor layer 60 is at least more than 40 micrometers, wherein a length of a channel for the regular semiconductor layer 60 is less than about 10 micrometers. Reducing a size of the semiconductor layer 60 except the channel region helps to increase the aperture ratio. The more the pixel region is increased, the more the resolution is increased, and the less the size of the pixel region is reduced. Accordingly, the less the size of the thin film transistor in the pixel region is reduced, the less the size of the channel is also reduced. Accordingly, the small molecule organic semiconductor layer 60 using the shadow mask 70 is not suitable for a high-resolution array substrate because the width W1 of the semiconductor layer 60 is at least more than about 40 micrometers.

Further, when the source and drain electrodes are formed later by the photolithography process using a development solution and a stripping solution, those solutions will damage the semiconductor layer 60 under the source and drain electrodes. Therefore, it is difficult to apply the small molecule organic semiconductor layer in an array substrate of the high resolution LCD.

SUMMARY OF THE INVENTION

The present invention is directed to an array substrate and a method of fabricating the same, which substantially obviate one or more of problems due to limitations and disadvantages of the background art.

An object of the present invention is to provide an array substrate of an LCD device which has a channel region within a few micrometers and can be manufactured by evaporating a small molecule organic semiconductor material susceptible to moisture.

Another object of the present invention is to provide a method of fabricating an array substrate of an LCD device which has a channel region within a few micrometers and can be manufactured by evaporating a small molecule organic semiconductor material susceptible to moisture.

To achieve these and other advantages and in accordance with the purpose of the present invention, as embodied and described, a liquid crystal display structure includes: a pixel region; and a thin film transistor on a substrate, the thin film transistor being located adjacent to the pixel region, the thin film transistor including: a gate electrode; a gate insulating layer having a top surface; a source electrode and a drain electrode at the top surface of the gate insulating layer; a semiconductor layer disposed at the top surface of the gate insulating layer, the semiconductor layer between the source electrode and the drain electrode defining a channel region, the semiconductor layer including a small molecule organic semiconductor material; and a first passivation layer covering the channel region, a top surface of the first passivation layer coinciding with or being below a top surface of each of the source electrode and the drain electrode.

In another aspect, a method of fabricating a liquid crystal display structure includes the steps of: forming a gate electrode on a substrate; forming a gate insulating layer; forming a source electrode, a drain electrode, and a channel region between the source electrode and the drain electrode above the gate insulating layer; forming a semiconductor layer by evaporating a small molecule organic semiconductor material in the channel region; and forming a first passivation layer covering the semiconductor layer so that a top surface of the first passivation layer coincides with or is below a top surface of each of the source electrode and the drain electrode.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE ILLUSTRATED EMBODIMENT

Reference will now be made in detail to the illustrated embodiment of the present invention, which is illustrated in the accompanying drawings. Wherever possible, similar reference numbers will be used throughout the drawings to refer to the same or like parts.

FIGS. 3A-3C, 4A-4C, 5A-5C, 6A-6C, 7A-7C, 8A-8C and 9A-9C are schematic cross-sectional views showing a process of manufacturing an array substrate of an LCD device according to a first embodiment of the present invention. Here, FIGS. 3A, 4A, 5A, 6A, 7A, 8A and 9A show a pixel region P including a thin film transistor region Tr; FIGS. 3B, 4B, 5B, 6B, 7B, 8B and 9B show a gate pad region GP; and FIGS. 3C, 4C, 5C, 6C, 7C, 8C and 9C show a data pad region DP.

Although not shown, when a base substrate for the process is a plastic substrate, the plastic substrate may be severely bent due to the flexibility through a loading step. Accordingly, a rigid substrate such as glass may be attached to the base substrate.

Figure 1:
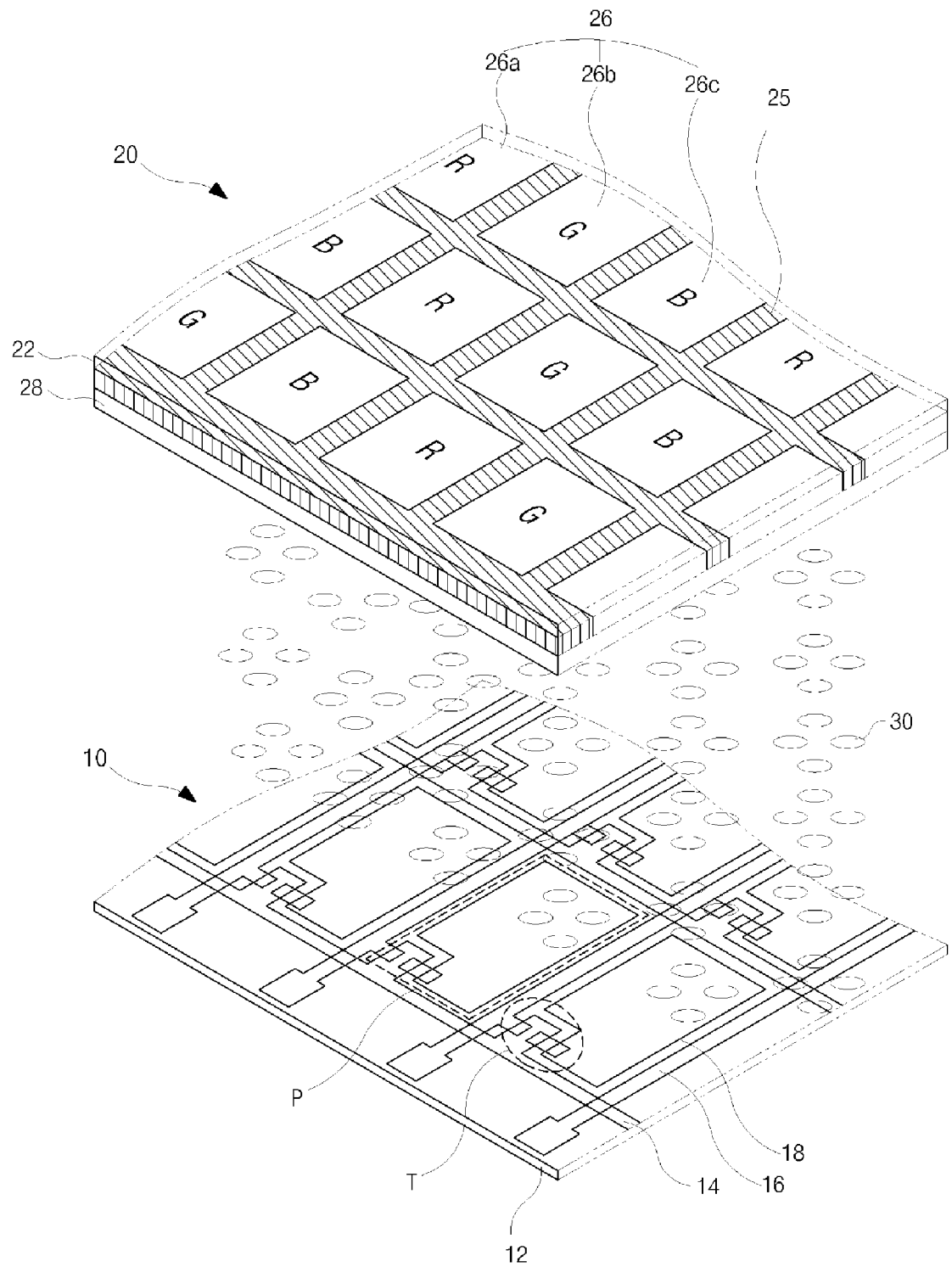
FIG. 1 is an exploded perspective view of an LCD device according to the related art.
Figure 2:
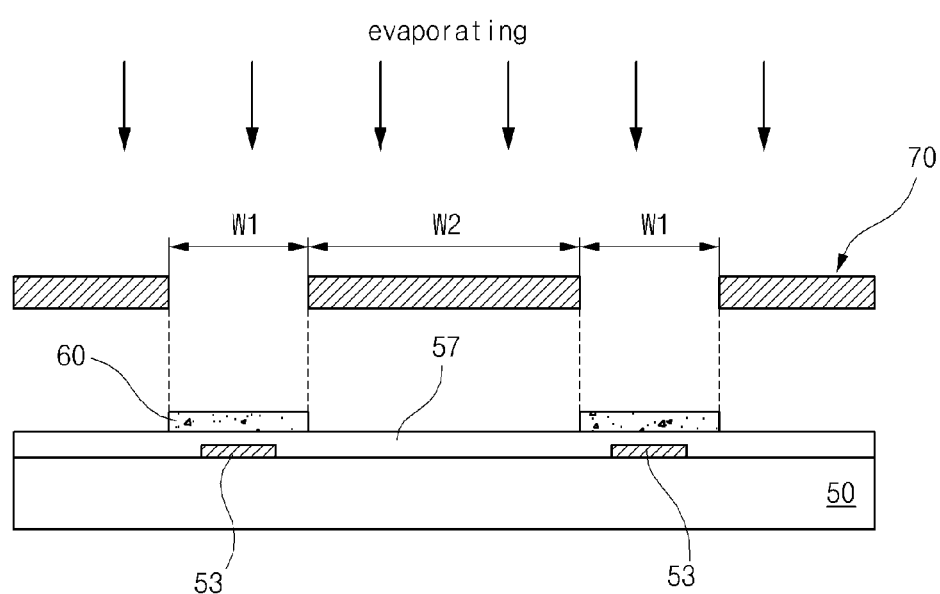
FIG. 2 is a schematic cross-sectional view of an array substrate including a semiconductor layer of a small molecule organic semiconductor material for an LCD device using a flexible plastic substrate according to the related art.
Figure 3A:
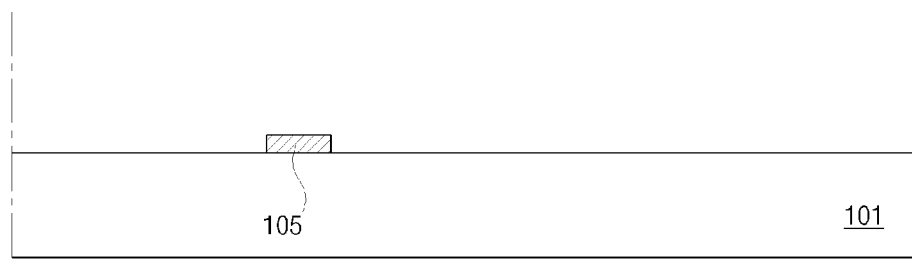
FIGS. 3A-3C, 4A-4C, 5A-5C, 6A-6C, 7A-7C, 8A-8C and 9A-9C are schematic cross-sectional views showing a process of manufacturing an array substrate of an LCD device according to a first embodiment of the present invention.
Figure 3B:
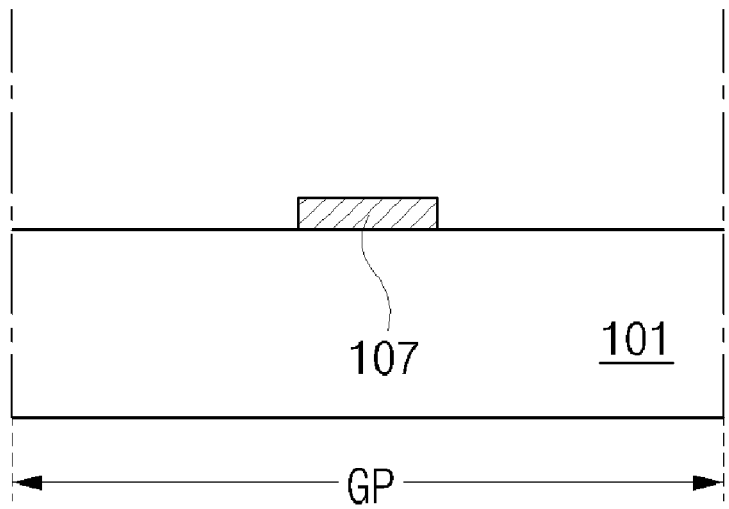
Figure 3C:
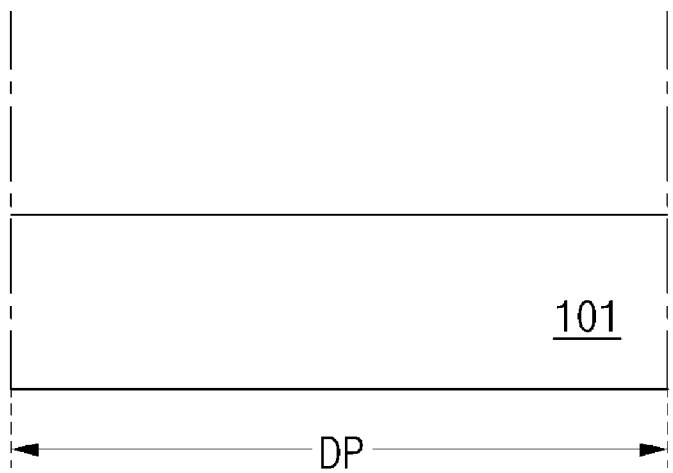

In FIGS. 3A-3C, a first metal layer (not shown) is deposited on a substrate 101 as a base substrate by sputtering under a low temperature such as about less than 200 degrees Celsius. Next, a photoresist material is coated on the first metal layer and a mask (not shown) having an opening portion is disposed over the photoresist material. A photoresist pattern (not shown) is formed by exposing and developing the photoresist material using the mask. At this time, a portion of the first metal layer is exposed through the photoresist pattern. Then, a gate line (not shown), a gate electrode 105 and a gate pad electrode 107 are formed by etching the exposed first metal layer. Although not shown, the gate line is connected to the gate electrode 105 and the gate pad electrode 107 is connected to an end portion of the gate line. Next, the photoresist pattern overlapping the gate line, the gate electrode 105 and the gate pad electrode 107 is removed from the substrate 101 by ashing or stripping.

Figure 4A:
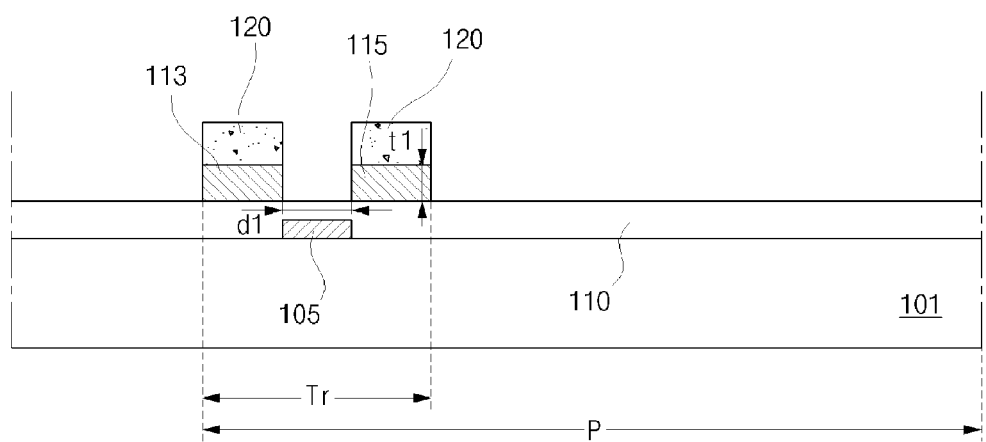
Figure 4B:
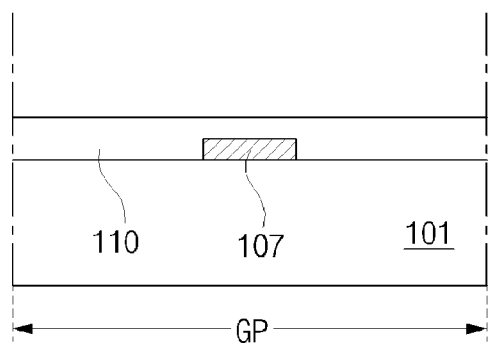
Figure 4C:
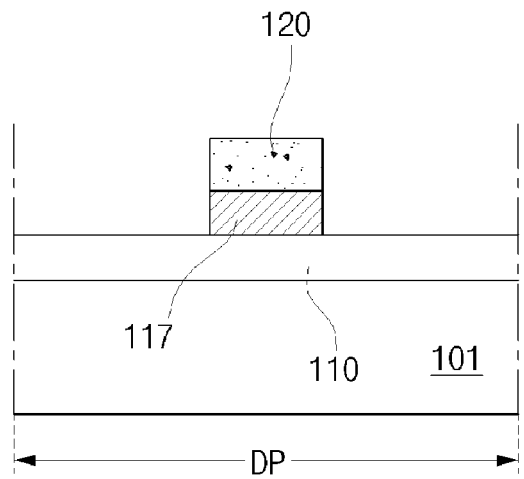

In FIGS. 4A-4C, a gate insulating layer 110 is formed over the substrate 101 including the gate line, the gate electrode 105 and the gate pad electrode 107 by coating an organic material such as a polyvinylpyrrolidine (PVP) and benzocyclobutene (BCB). In this embodiment, the gate insulating layer 110 made of the organic insulating material has a level top surface without a step between a portion including the gate patterns such as the gate line, the gate electrode 105 and the gate pad electrode 107 and another portion not including the gate patterns. However, it is not required that the gate insulating layer 110 has a level top surface, which will be further described hereinbelow.

Next, a second metal layer is formed on the gate insulating layer 110 by depositing a metallic material under a low temperature such as about less than 200 degrees Celsius. Although the second metal layer of the related art has a thickness within a range 1,500 Angstroms to 2,000 Angstroms, a thickness t1 of the second metal layer of the first embodiment of the present invention is at least more than 3,000 Angstroms concerning a lift-off process that will be performed later.

A photoresist material is coated on an entire surface of the second metal layer and a mask having an opening portion is disposed over the photoresist material. A photoresist pattern 120 is formed by exposing and developing the photoresist material, wherein the photoresist pattern 120 is formed in a region for a data line (not shown), a source electrode 113, a drain electrode 115 and a data pad electrode 117. The second metal layer can be made of the same metallic material as the first metal layer.

Although not shown, the data line crossing the gate line to define the pixel region P, the source electrode 113, and the drain electrode 115 spaced apart from the source electrode 113, and the data pad electrode 117 are formed by etching the exposed metal layer corresponding to the open portion of the photoresist pattern 120, wherein the source electrode 113 is connected to the data line and the data pad electrode 117 is connected to an end portion of the data line.

In this embodiment, the photoresist pattern 120 overlapping the data line, the source electrode 113, the drain electrode 115 and the data pad electrode 117 remains after forming the data line, the source electrode 113, the drain electrode 115 and the data pad electrode 117 without employing the steps of ashing or stripping. Here, an interval region between the source electrode 113 and the drain electrode 117 corresponds to a channel region, which may have a distance d1 of about 10 micrometers for a high resolution LCD device. Alternatively, the distance d1 may be less than 40 micrometers of a minimum limitation for a general resolution model.

Figure 5A:
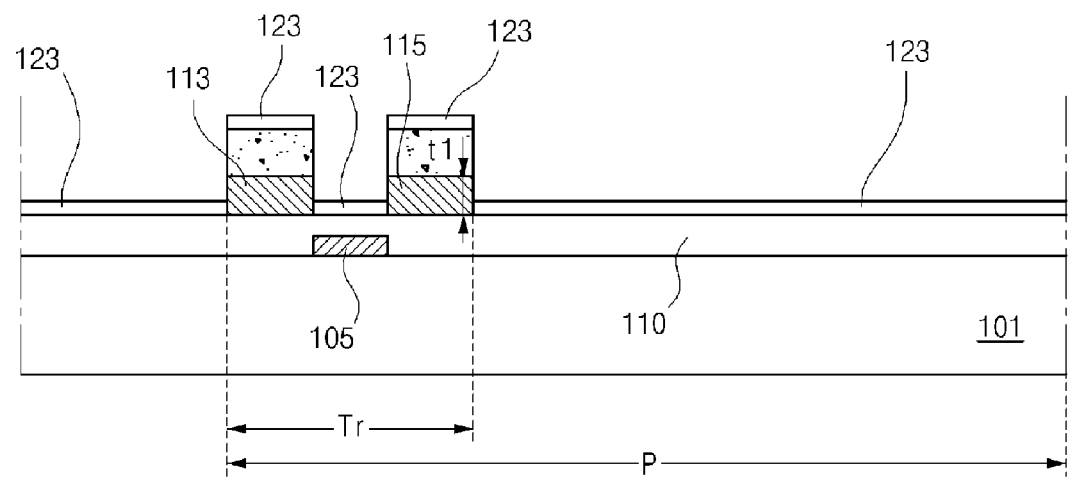
Figure 5B:
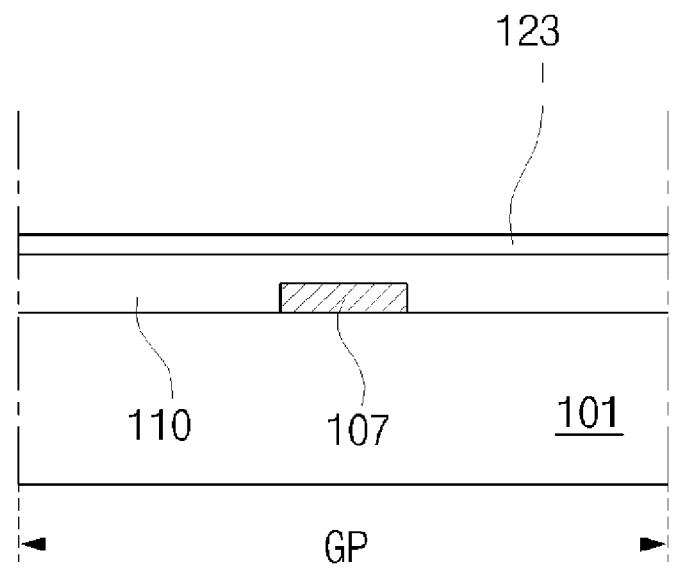
Figure 5C:
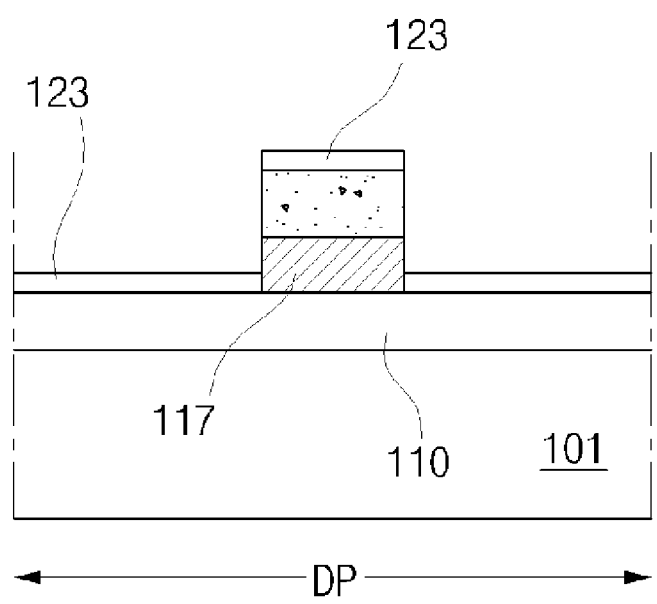

In FIGS. 5A-5C, a semiconductor layer 123 is formed by evaporating a small molecule organic semiconductor material on an entire surface of the substrate 101 having the data line, the source electrode 113, the drain electrode 115, and the photoresist pattern 120 overlapping the data line, the source electrode 113, the drain electrode 115. For example, the transmittance of the small molecule organic semiconductor material is more than about 85% and this small molecule organic semiconductor material includes Pentacene.

For example, a thickness of the semiconductor layer 123 is about 500 Angstroms. It is noted that the data line, the source electrode 113, the drain electrode 115 and the data pad electrode 117 include a top surface and a side portion, wherein the side portion is exposed through the semiconductor layer 123 due to a characteristic of the step of evaporating. Generally, the semiconductor layer 123 formed by evaporating has a weak deposition property at the side surface having a step and thus is rarely deposited in the side surface of the source and drain electrodes 113 and 115.

As explained above, the thickness t1 of each of the source and drain electrodes 113 and 115 is at least about 3,000 Angstroms including another thickness of the photoresist pattern 120, and hence the semiconductor layer 123 is easily cut at the side surface of the source and drain electrodes 113 and 115. In addition, since the semiconductor layer 123 in the pixel region P will not be removed, the semiconductor layer 123 should have high light transmittance. For example, the semiconductor layer 123 of this embodiment is made of the small molecule organic semiconductor material of about 85% transmittance.

Figure 6A:
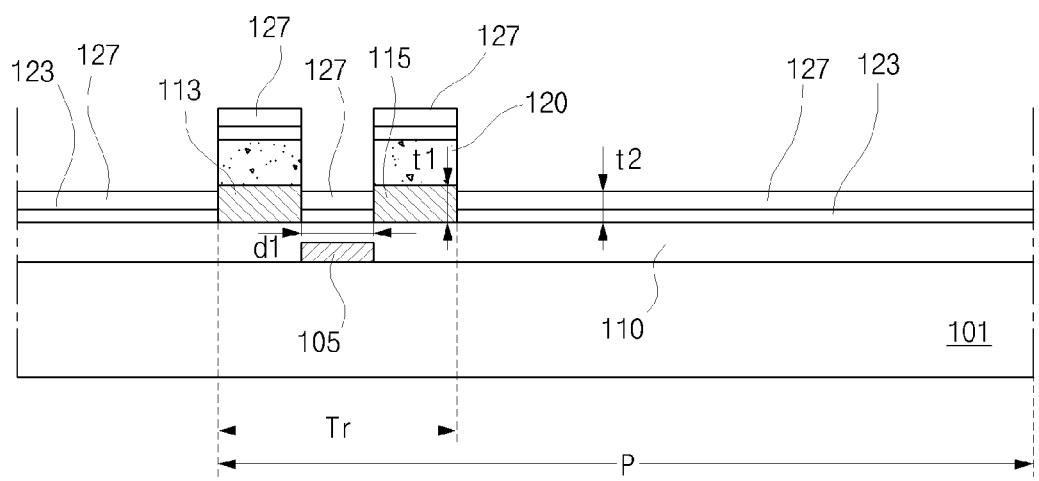
Figure 6B:
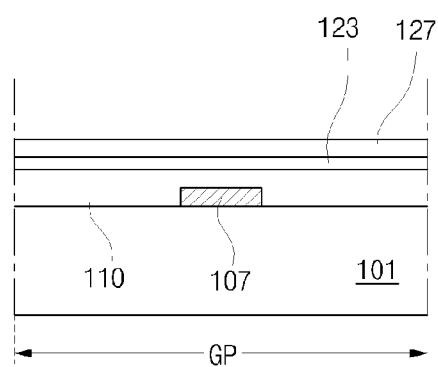
Figure 6C:
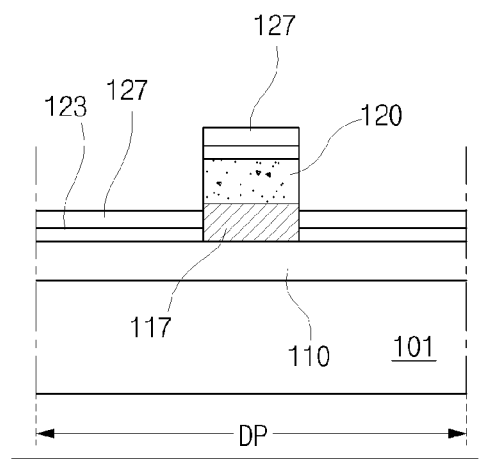

In FIGS. 6A-6C, a first passivation layer 127 is formed by depositing an inorganic material such as a silicon oxide (SiOx) on the semiconductor layer 123. Here, the first passivation layer 127 is not deposited at the side surface of the source and drain electrodes 113 and 115. In this embodiment, the thickness t1 of each of the data line, the source electrode 113, the drain electrode 115 and the data pad electrode 117 is equal to or greater than a total thickness t2 of the combination of the semiconductor layer 123 and the first passivation layer 127. In addition, a portion of the first passivation layer 127 on the photoresist pattern 120 is higher than another portion of the first passivation layer 127 in the pixel region P.

Figure 7A:
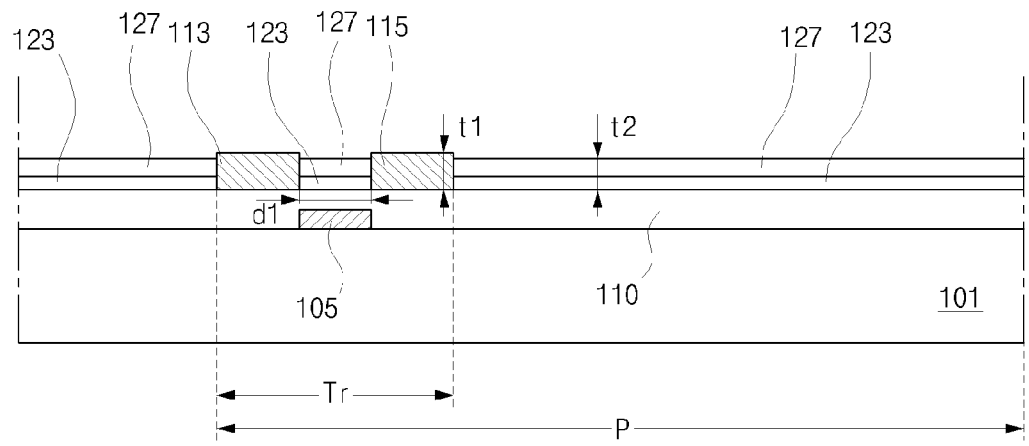
Figure 7B:
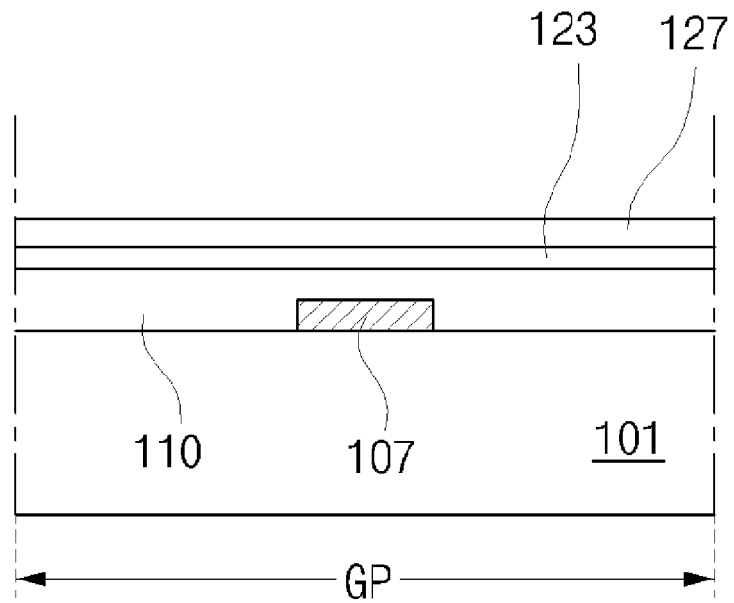
Figure 7C:
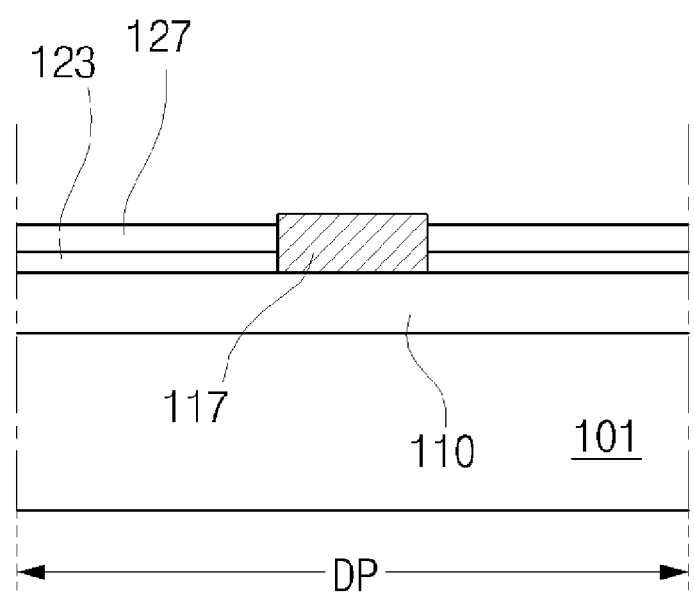

Next, in FIGS. 7A-7C, the photoresist pattern 120 is removed by dipping using a stripping solution. Specifically, since the side surface of the source and drain electrodes 113 and 115 are exposed through the semiconductor layer 123 and the first passivation layer 127, in the step of the dipping, the stripping solution easily contacts and reacts with the exposed portion of the photoresist pattern 120 near to the side surface of the source and drain electrodes 113 and 115. At this time, portions of the semiconductor layer 123 and the first passivation layer 127 overlapping the photoresist pattern 120 are simultaneously removed with the photoresist pattern 120. The process can be referred to as a lift-off process. In this embodiment, a top surface of the photoresist pattern 120 dose not contact the stripping solution, but a side surface of the photoresist pattern 120 contacts the stripping solution due to the open portions of the semiconductor layer 123 and the first passivation layer 127 at the side surface of the source and drain electrodes 113 and 115, thereby separating the photoresist pattern 120 from the substrate 101.

As mentioned, in the first embodiment, the gate insulating layer 110 made of the organic insulating material has a level top surface without a step, and the thickness t1 of each of the data line, the source electrode 113, the drain electrode 115 and the data pad electrode 117 is equal to or greater than a total thickness t2 of the combination of the semiconductor layer 123 and the first passivation layer 127. However, the gate insulating layer 110 may have a top surface with a step structure. When the gate insulating layer 110 has a top surface with a step structure, the top surface of the first passivation layer 127 may coincide with or be below the top surface of each of the source electrode 113 and the drain electrode 115 to facilitate the lift-off process. In other words, by controlling the top surface of the first passivation layer 127 to coincide with or be below the top surface of each of the source electrode 113 and the drain electrode 115, the sidewalls of the photoresist pattern 120 will not be covered by the first passivation layer 127. Accordingly, the photoresist pattern 120 can be effectively removed, thereby removing the semiconductor layer 123 and the first passivation layer 127 overlapping the photoresist pattern 120 during the lift-off process. Accordingly, it is not necessary that the gate insulating layer 110 is a level top panel and the thickness t1 of the source and drain electrodes 113 and 115 is equal or greater to the thickness t2 of the combination of the first passivation layer 127 and the semiconductor layer 123. If the top surface of the first passivation layer 127 coincides with or is below the top surface of each of the source electrode 113 and the drain electrode 115, the photoresist pattern 120 can be effectively removed because the entire sidewalls of the photoresist pattern 120 are exposed when performing the lift-off process.

Although the semiconductor layer 123 is made of a material that is susceptible to the stripping solution, the semiconductor layer 123 is protected from the stripping solution because the first passivation layer 127 covers the semiconductor layer 123. Since the semiconductor layer 123 is formed between the source electrode 113 and the drain electrode 115, a width d1 of the semiconductor layer 123 can be controlled as a desired value, for example, less than about 40 micrometers.

Figure 8A:
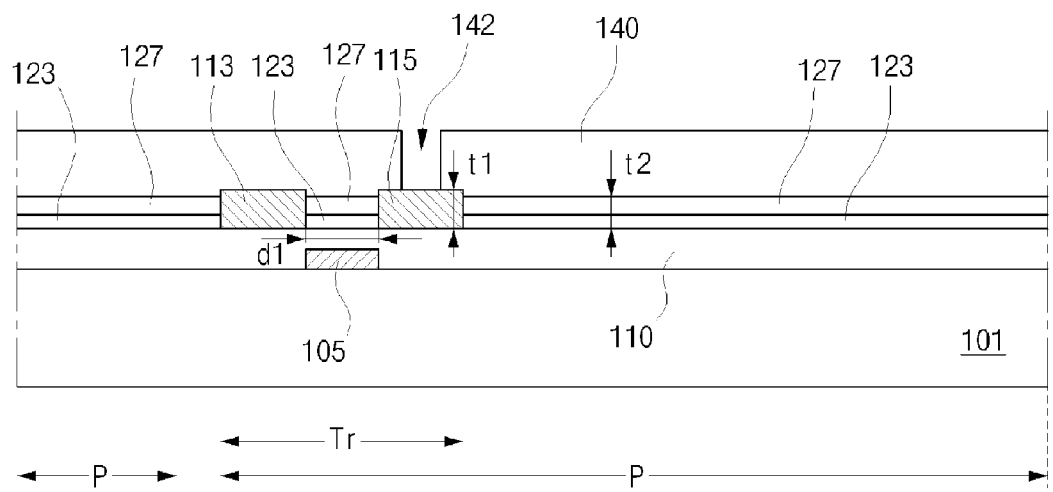
Figure 8B:
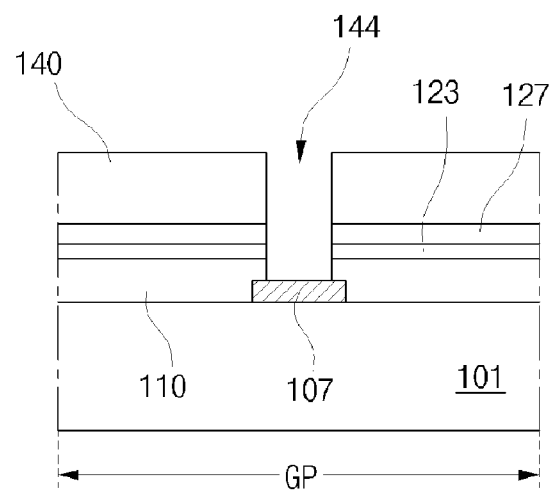
Figure 8C:
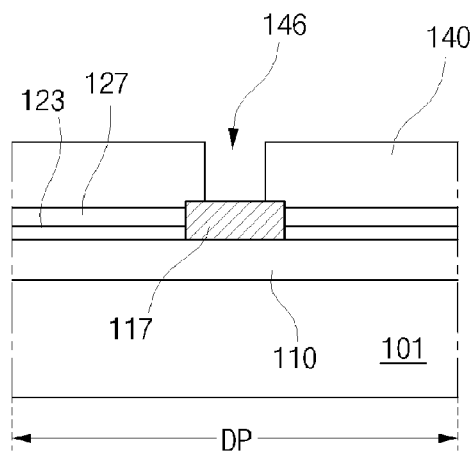

In FIGS. 8A-8C, a second passivation layer 140 is formed by coating an organic material such as a polyvinylpyrrolidine (PVP) and benzocyclobutene (BCB) on the first passivation layer 127, the data line, the source electrode 113, and the drain electrode 115. In this embodiment, the second passivation layer 140 has a level surface because it is made of an organic material. Next, first, second and third contact holes 142, 144 and 146 that respectively expose portions of the drain electrode 115, the gate pad electrode 107 and the data pad electrode 117 in the second passivation layer 140 are formed by patterning the second passivation layer 140.

Figure 9A:
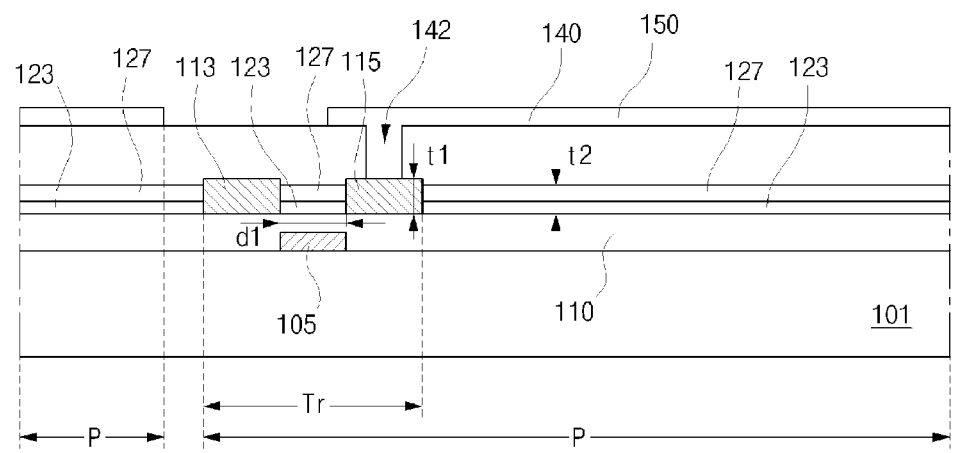
Figure 9B:
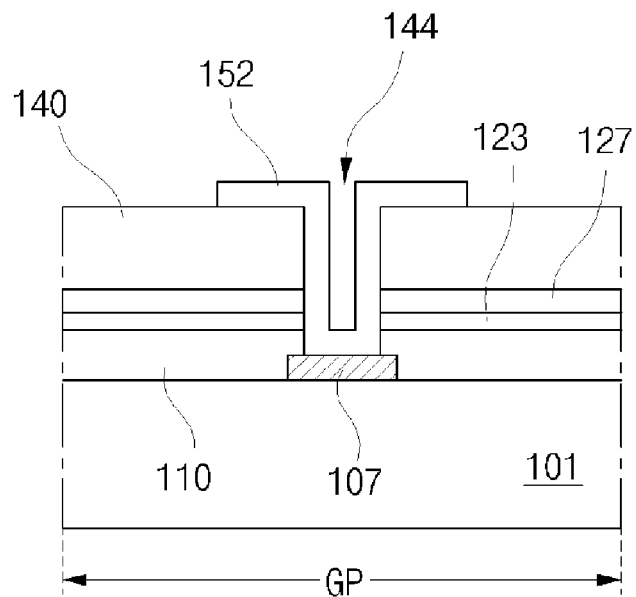
Figure 9C:
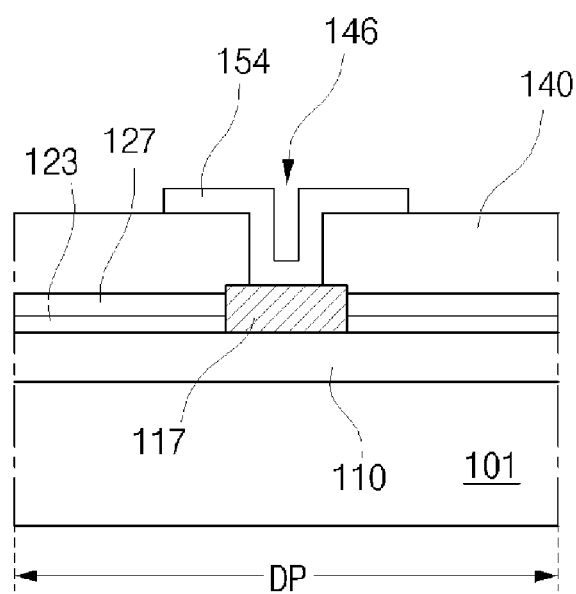

In FIGS. 9A-9C, a pixel electrode 150 is formed by depositing and patterning a transparent material such as indium tin oxide (ITO) or indium zinc oxide (IZO), wherein the pixel electrode 150 is connected to the drain electrode 115 via the first contact hole 142. A gate auxiliary pad electrode 152 is connected to the gate pad electrode 107 via the second contact hole 144, and a data auxiliary pad electrode 154 is connected to the data pad electrode 117 via the third contact hole 146.

Accordingly, the semiconductor layer 123 of the small molecule organic semiconductor material can be controlled to a few micrometers. However, in the first embodiment, the semiconductor layer 123 of the first embodiment is formed in the pixel region P as well as the thin film transistor region Tr. Therefore, the semiconductor layer 123 should be made of the material of about 85% transmittance. Therefore, there is a limitation in the material choice of the semiconductor layer 123 in the first embodiment. Further, the semiconductor layer 123 may affect the luminance of the pixel region P although the semiconductor layer 123 is selected from a material having good transmittance.

To increase the choice of the materials for the semiconductor layer, the semiconductor layer 123 is formed so as not to occupy the pixel region P in a second embodiment of the present invention. For convenience sake, since steps before forming the semiconductor layer 123 according to the first embodiment of the present invention can be applied to the second embodiment, the corresponding description of the second embodiment will not be repeated here.

FIGS. 10A-10C, 11A-11C, 12A-12C, 13A-13C and 14A-14C are schematic cross-sectional views showing a process of manufacturing an array substrate of an LCD device according to the second embodiment of the present invention. Here, FIGS. 10A, 11A, 12A and 13A show a pixel region P including a thin film transistor region Tr; FIGS. 10B, 11B, 12B and 13B show a gate pad region GP; and FIGS. 10C, 11C, 12C and 13C show a data pad region DP.

Figure 10A:
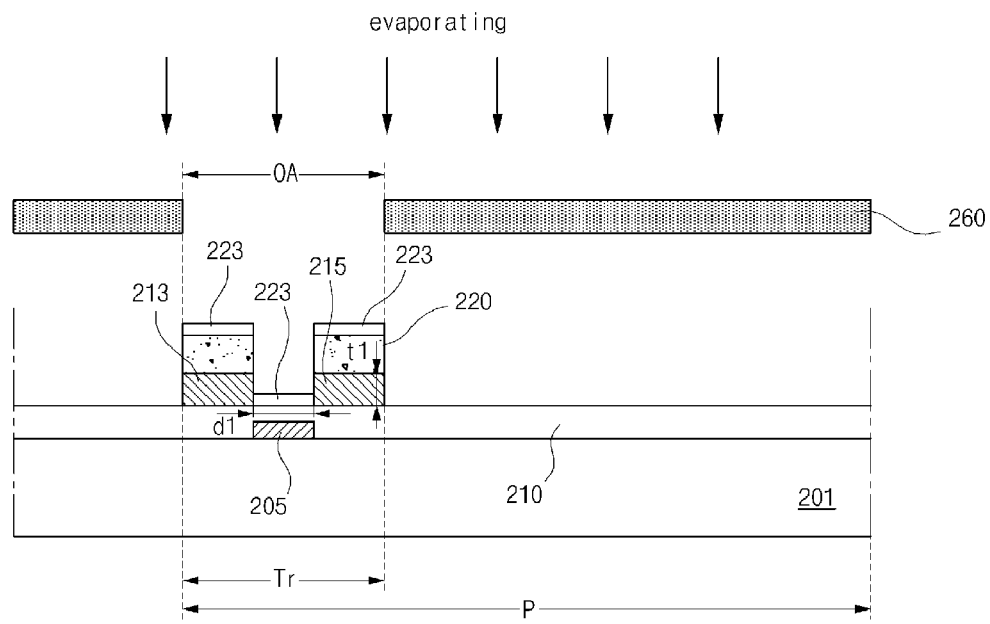
FIGS. 10A-10C, 11A-11C, 12A-12C, 13A-13C, and 14A-14C are schematic cross-sectional views showing a process of manufacturing an array substrate of an LCD device according to a second embodiment of the present invention.
Figure 10B:
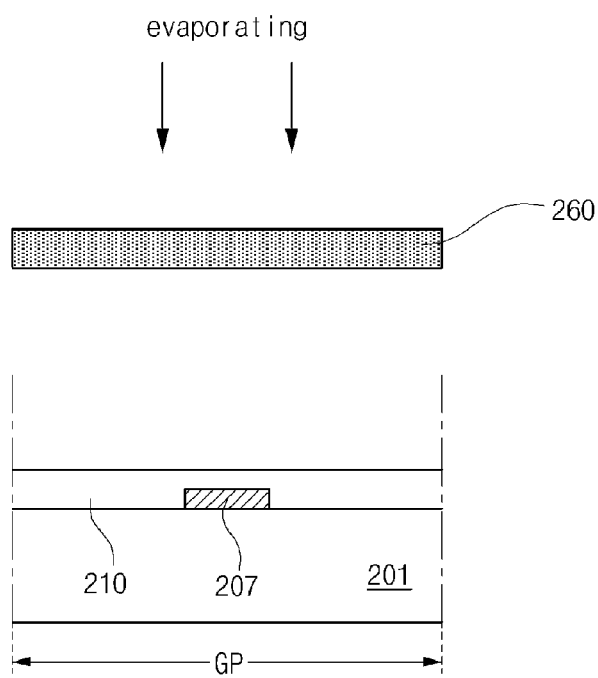
Figure 10C:
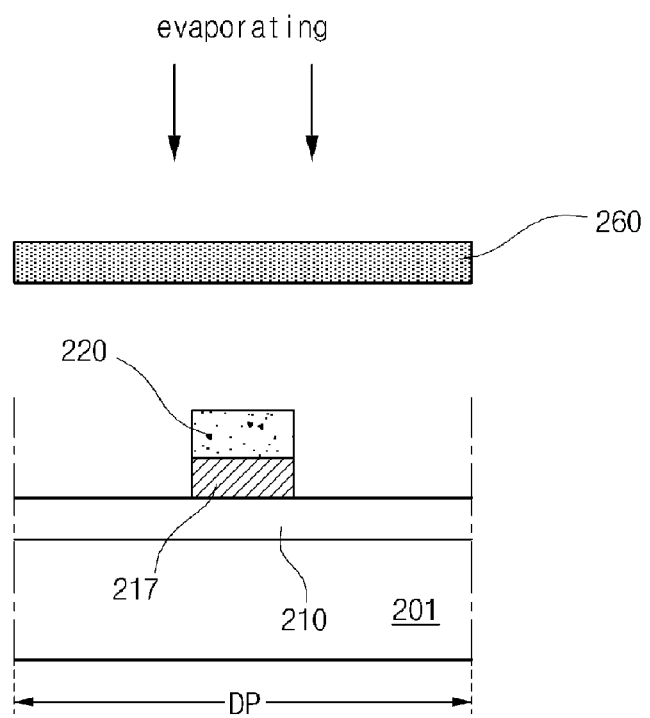

In FIGS. 10A-10C, a data line (not shown), a source electrode 213, a drain electrode 215 and a data pad electrode 217 are formed on a gate insulating layer 210 and a photoresist pattern 220 for patterning the data line, the source electrode 213, the drain electrode 215 and the data pad electrode 217 remains. A shadow mask 260 having an open portion OA is disposed over the photoresist pattern 220, wherein the open portion OA corresponds to the source electrode 213, the drain electrodes 215 and an interval between the source and drain electrodes 213 and 215, i.e., the channel region. A semiconductor layer 223 is formed by evaporating the material of the semiconductor layer through the shadow mask 260 onto a substrate 201 including the photoresist pattern 220, wherein the semiconductor layer 223 may be made of a small molecule organic semiconductor material without concerning the transmittance in comparison with the semiconductor layer 123 (of FIG. 5a) of the first embodiment. This is because the semiconductor layer 223 is not formed in the pixel region P and the transmittance of the semiconductor layer 223 is no longer an issue.

Figure 11A:
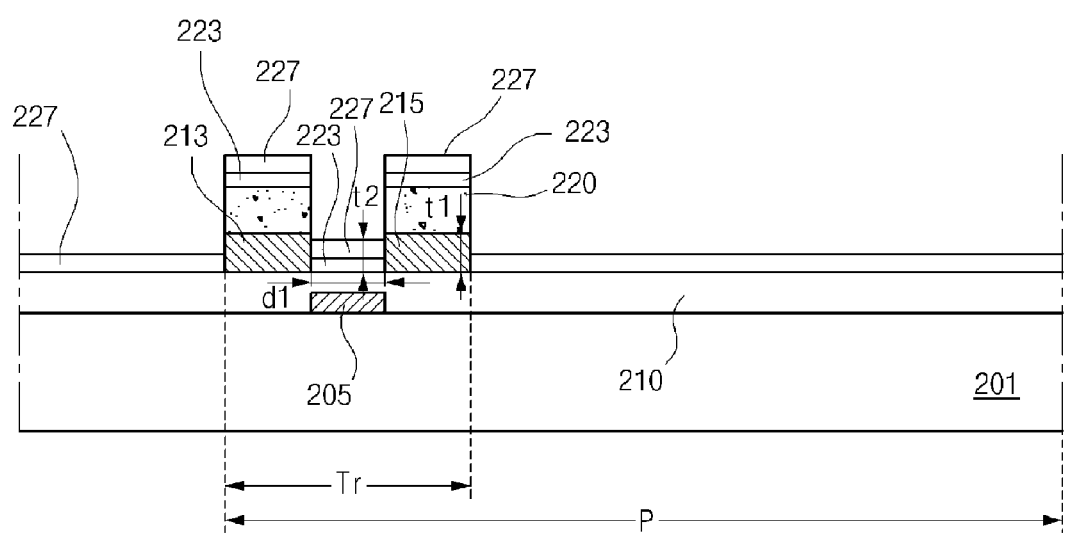
Figure 11B:
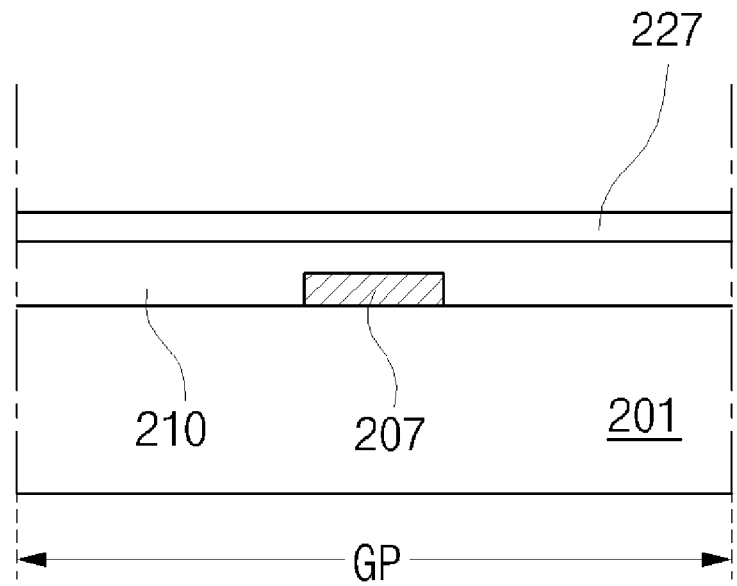
Figure 11C:
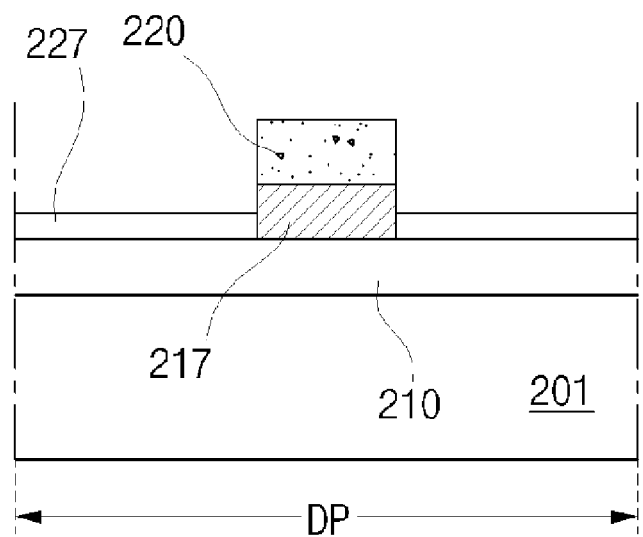

In FIGS. 11A-11C, a first passivation layer 227 is formed by depositing an inorganic material such as a silicon oxide (SiOx) over an entire surface of the substrate 201 including the semiconductor layer 223. The first passivation layer 227 also directly contacts the gate insulating layer 210 in the pixel region. Here, the first passivation layer 227 is not formed at the side surfaces of the data line, the source electrode 213, the drain electrode 215 and the data pad electrode 217 with a substantially high step. In this embodiment, the thickness t1 of each of the data line, the source electrode 213, the drain electrode 215 and the data pad electrode 217 is equal to or greater than a total thickness t2 of the combination of the semiconductor layer 223 and the first passivation layer 227.

Figure 12A:
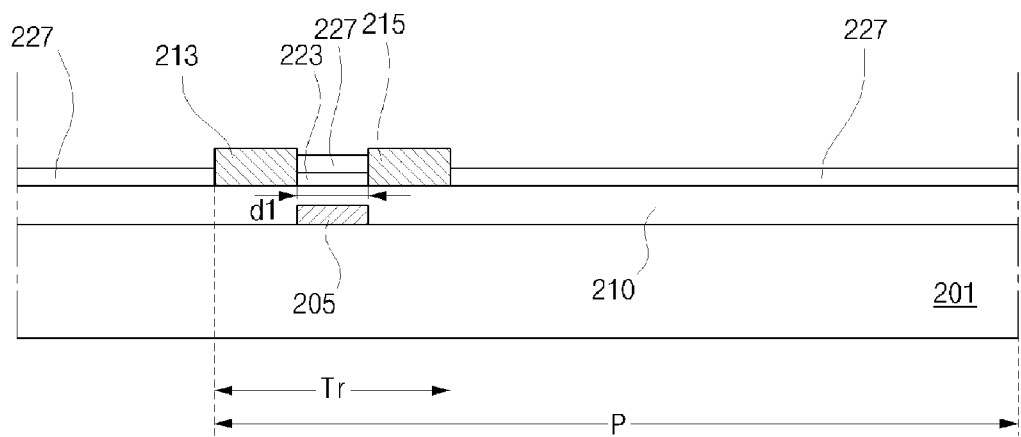
Figure 12B:
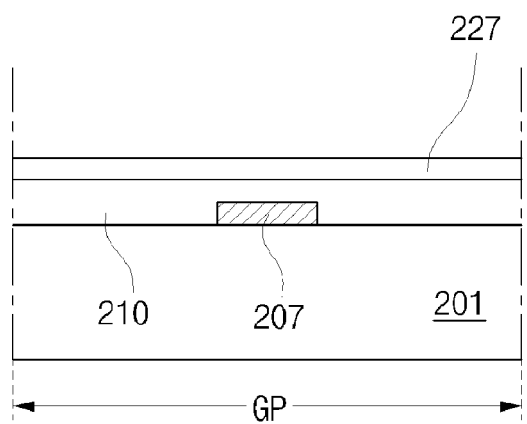
Figure 12C:
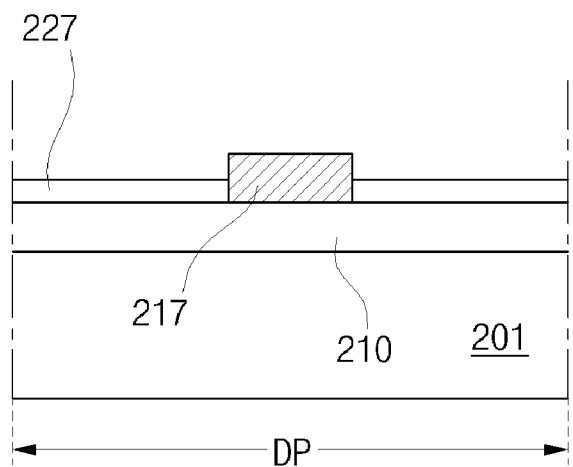

In FIGS. 12A-12C, the photoresist pattern 220 is removed from the substrate 201 by dipping using a stripping solution. This process may be referred to as a lift-off process. In addition, the semiconductor layer 223 and the first passivation layer 227 on the photoresist pattern 220 are simultaneously removed and the semiconductor layer 223 is patterned between the source and drain electrodes 213 and 215 covered by the first passivation layer 227. Accordingly, since the semiconductor layer 223 has a width corresponding to a distance d1 between the source and drain electrodes 213 and 215, the width of the semiconductor layer 223 can be easily controlled. It should be noted that although in this embodiment the gate-insulating layer 210 has a level top surface, the scope of the present invention is not limited to this embodiment. In case that the gate insulating layer 210 has a top surface with a step structure, the top surface of the first passivation layer 227 may coincide with or be below the top surface of each of the source electrode 213 and the drain electrode 215 to facilitate the lift-off process.

Figure 13A:
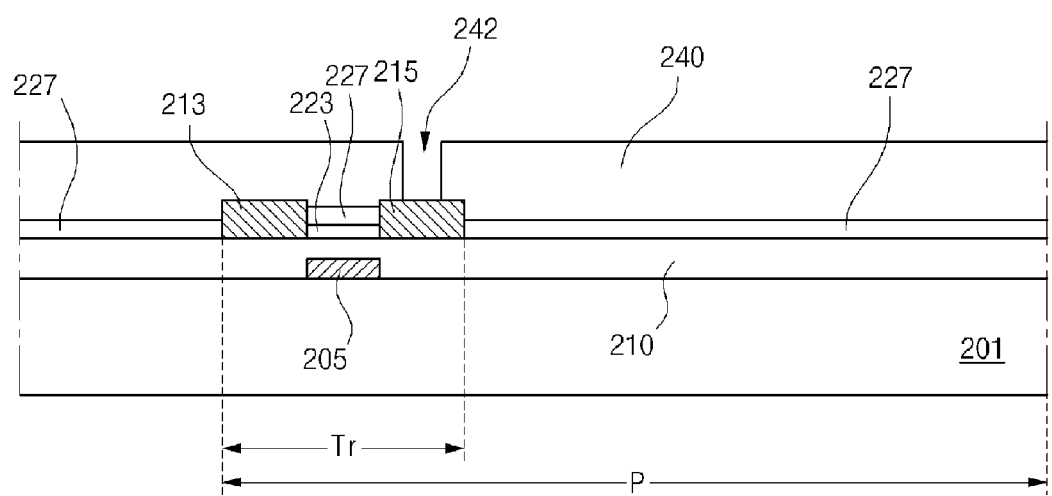
Figure 13B:
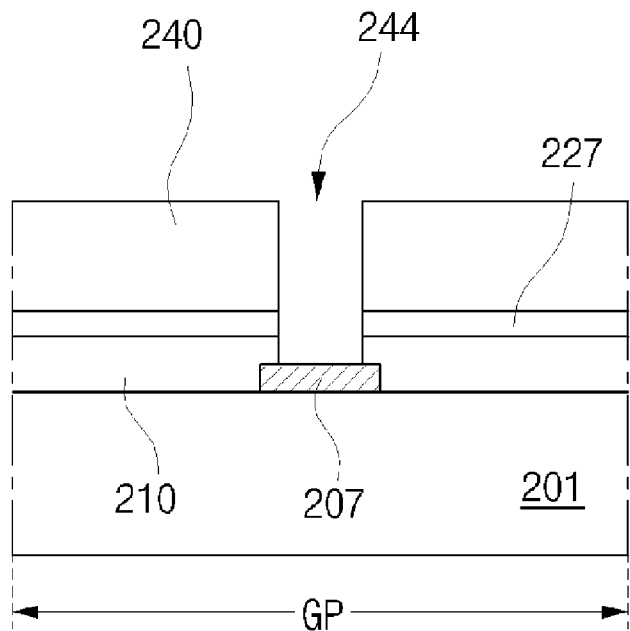
Figure 13C:
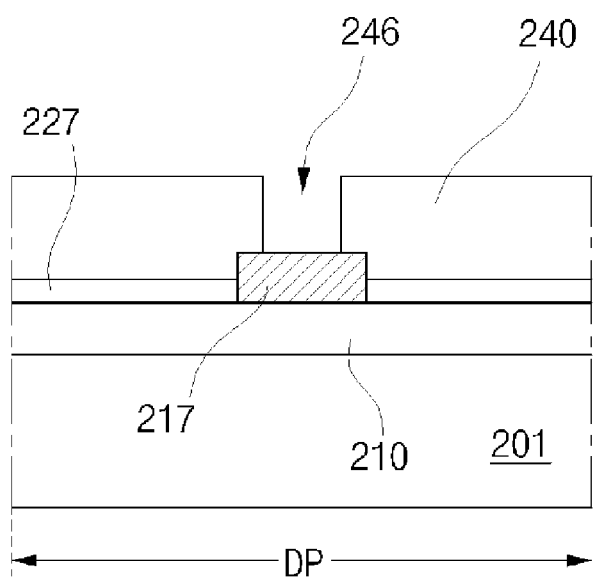

In FIGS. 13A-13C, a second passivation layer 240 is formed by coating an organic material such as a polyvinylpyrrolidine (PVP) and benzocyclobutene (BCB) on an entire surface of the substrate 201 including the semiconductor layer 223. Next, first, second and third contact holes 242, 244 and 246 that respectively expose portions of the drain electrode 215, the gate pad electrode 207 and the data pad electrode 217 in the second passivation layer 240 are formed by patterning the second passivation layer 240.

Figure 14A:
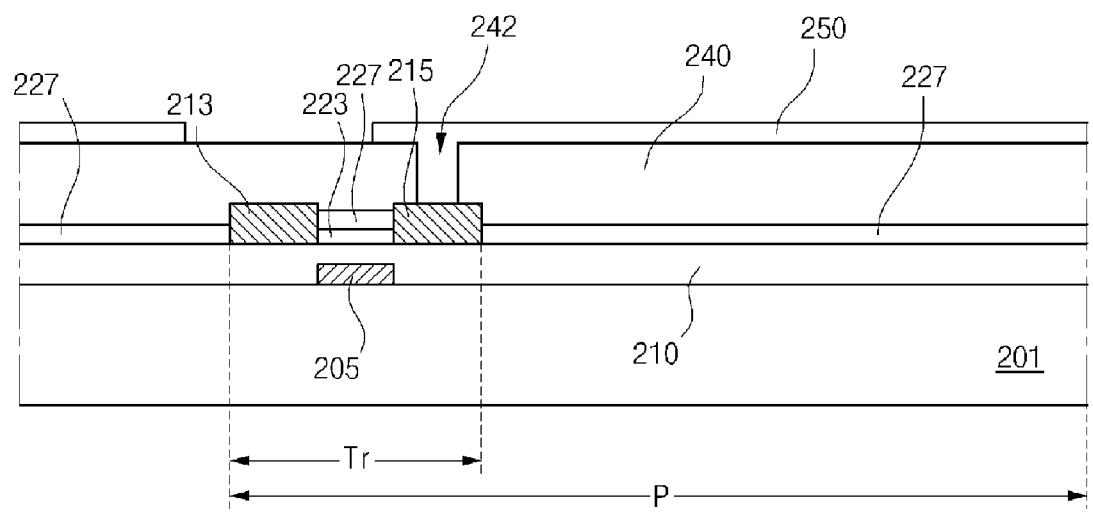
Figure 14B:
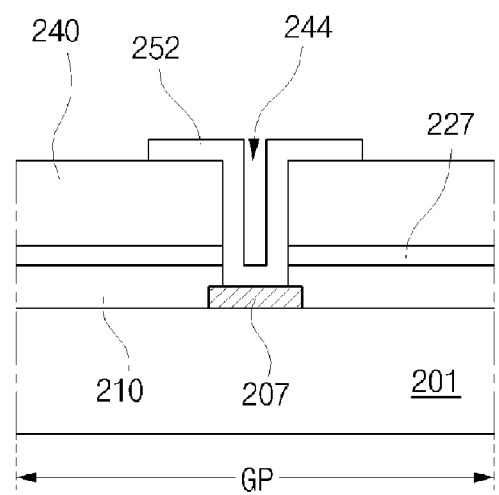
Figure 14C:
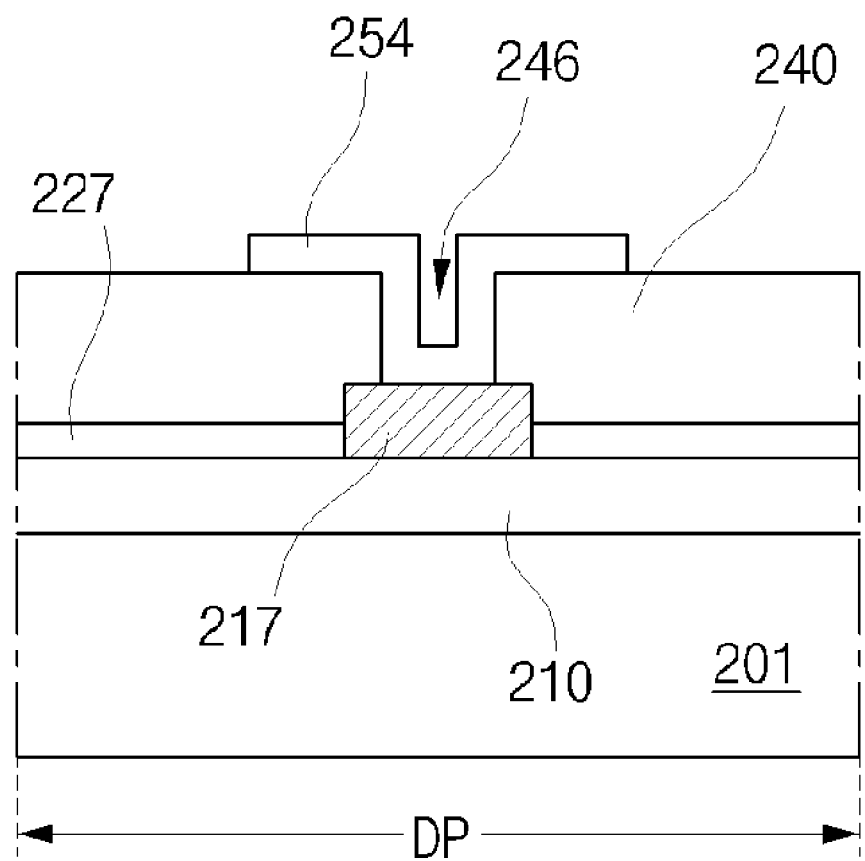

In FIGS. 14A-14C, a pixel electrode 250 is formed by depositing and patterning a transparent material such as indium tin oxide (ITO) or indium zinc oxide (IZO), wherein the pixel electrode 250 is connected to the drain electrode 215 via the first contact hole 242. A gate auxiliary pad electrode 252 is connected to the gate pad electrode 207 via the second contact hole 244, and a data auxiliary pad electrode 254 is connected to the data pad electrode 217 via the third contact hole 246.

Accordingly, the array substrate of the LCD device according to the present invention can provide a fine pattern without a shadow mask or a semiconductor layer using the shadow mask that patterning can be performed later, thereby improving an aperture ratio and luminance.

In addition, although a small molecule organic semiconductor material is susceptible to moisture and chemical treatment, the present invention can provide an array substrate and a method of fabricating the same protecting the small molecule organic semiconductor material from moisture or chemical treatment. Accordingly, a flexible and high resolution LCD device having the semiconductor layer of the small molecule organic semiconductor material can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display structure, comprising:
a pixel region; and
a thin film transistor on a substrate, the thin film transistor being located adjacent to the pixel region, the thin film transistor including:
a gate electrode;
a gate insulating layer having a top surface;
a source electrode and a drain electrode at the top surface of the gate insulating layer;
a semiconductor layer disposed at the top surface of the gate insulating layer, the semiconductor layer between the source electrode and the drain electrode defining a channel region, the semiconductor layer including a small molecule organic semiconductor material; and
a first passivation layer covering the channel region, a top surface of the first passivation layer coinciding with or being below a top surface of each of the source electrode and the drain electrode, wherein the gate insulating layer is further disposed in the pixel region, the first passivation layer directly contacting the top surface of the gate insulating layer in the pixel region.

2. The liquid crystal display structure of claim 1, wherein the top surface of the gate insulating layer is a level top surface.

3. The liquid crystal display structure of claim 2, wherein a thickness of the source electrode and the drain electrode is equal to or larger than a sum of a thickness of the semiconductor layer and a thickness of the first passivation layer.

4. The liquid crystal display structure of claim 1, wherein the semiconductor layer is further disposed in the pixel region.

5. The liquid crystal display structure of claim 1, wherein the small molecule organic semiconductor material is a transparent material.

6. The liquid crystal display structure of claim 5, wherein the small molecule organic semiconductor material has a light transmittance more than about 85%.

7. The liquid crystal display structure of claim 6, wherein the small molecule organic semiconductor material includes Pentacene.

8. The liquid crystal display structure of claim 1, wherein the source electrode and the drain electrode have a thickness of more than 3,000 Angstroms.

9. The liquid crystal display structure of claim 1, wherein the channel region has a width less than about 40 µm.

10. The liquid crystal display structure of claim 1, further comprising a second passivation layer disposed above the first passivation layer, the second passivation layer directly contacting the top surface of each of the source electrode and the drain electrode.

11. The liquid crystal display structure of claim 1, wherein the substrate is a plastic substrate.

* * * * *